W. GODBER.
JEWEL MOUNTING.
APPLICATION FILED MAR. 4, 1907.

1,049,354.

Patented Jan. 7, 1913.

WITNESSES:
C. L. Belcher
Otto S. Schairer.

INVENTOR
William Godber
BY
ATTORNEY

UNITED STATES PATENT OFFICE.

WILLIAM GODBER, OF SOUTH ORANGE, NEW JERSEY, ASSIGNOR TO WESTINGHOUSE ELECTRIC & MANUFACTURING COMPANY, A CORPORATION OF PENNSYLVANIA.

JEWEL-MOUNTING.

1,049,354.  Specification of Letters Patent.  Patented Jan. 7, 1913.

Application filed March 4, 1907. Serial No. 360,510.

*To all whom it may concern:*

Be it known that I, WILLIAM GODBER, a citizen of the United States, and a resident of South Orange, in the county of Essex and State of New Jersey, have invented a new and useful Improvement in Jewel-Mountings, of which the following is a specification.

My invention relates to mountings for bearing jewels, and it has for its object to provide a mounting that may be more expeditiously and accurately assembled and that shall be more satisfactory in service than others heretofore employed.

Figure 1:
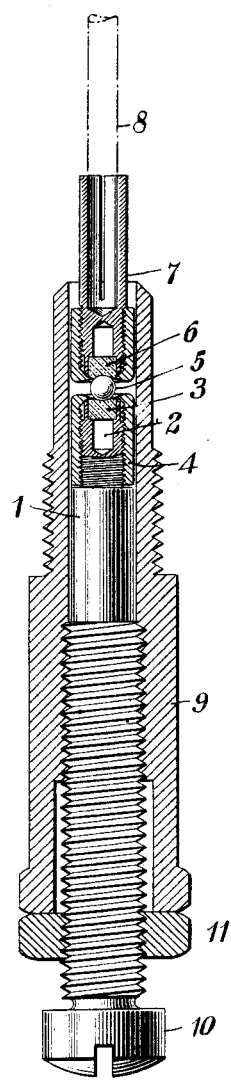
Figure 2:
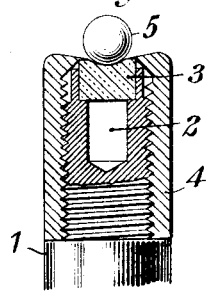

Figure 1 of the accompanying drawing is a view, partially in section and partially in elevation, of parts that embody my invention, and Fig. 2 is an enlarged sectional view of some of the parts shown in Fig. 1.

A cylindrical stem 1, the upper portion of which is somewhat reduced in diameter and screw-threaded, is provided in its upper end with a drilled recess 2 that is reamed or enlarged to a diameter and depth sufficient to receive a sapphire or other suitable jewel 3 having a concave upper surface. Threaded upon the reduced portion of the stem 1 is a cap 4 the external surface of which is flush with the shank of the stem. The cap 4 is provided in its upper end with an opening that is of slightly smaller diameter than the external diameter of the jewel 3, and its upper face is provided with a slightly concave contour in a manner and for a purpose which will be hereinafter more fully set forth. Bearing upon the concave face of the jewel 3 is a hardened steel ball 5 upon which, in turn, bears another jewel 6 that is mounted, similarly to the jewel 4, in a stem 7, the stem being tubular and split for the reception of the lower end of a shaft 8. The shank of the stem 1 is screw-threaded in a suitable sleeve 9 that extends upwardly around the jewel mountings upon both the stationary and the rotatable members, and thereby serves to retain the shaft 8 in vertical alinement with the stem 1 and to prevent escape of the ball from between the jewels 3 and 6. The lower end of the stem 1 is provided with a head 10 that is slotted for the reception of the end of a screw-driver, and the screw-threaded portion of the shank is provided with a lock nut 11 whereby the stem 1 may be retained rigidly in position with reference to the sleeve 9. The sleeve 9 is also exteriorly screw-threaded in order that it may be attached to any suitable part of a device in which the bearing may be employed.

In mounting the jewel, the recess in the upper end of the stem 1 is reamed or enlarged to the exact diameter of the jewel and the jewel is placed in position and accurately centered. The cap 4 is then applied, for the purpose of retaining the jewel in position, the upper end of the cap being, before application, of somewhat greater thickness than appears in the drawing. The end of the cap is then turned down to the desired thickness and to the concave form shown in order that the ball may be caused to roll into the concavity in the jewel and be prevented from bearing upon the ends of the caps.

I claim as my invention:

1. The combination with two relatively rotatable members each comprising a jewel having a concave bearing surface, a setting therefor consisting of a stem having an end recess in which the jewel is seated and a cap for the stem having an inwardly projecting end flange which engages the edges of the outer face of the jewel and has a concave surface that merges into the concave surface of the jewel, of a ball interposed between said jewels.

2. The combination with two relatively rotatable members each of which comprises a jewel having a concave face, a setting therefor consisting of a stem having an end recess in which the jewel is seated and a cap screw-threaded upon the stem and having a concave outer end provided with an inwardly projecting flange which engages the edge of the outer face of the jewel and merges into its surface, of a steel ball interposed between said jewels.

3. The combination with two relatively rotatable members each of which comprises a jewel having a concave face, a setting therefor consisting of a stem having an end recess in which the jewel is seated and a cap screw-threaded upon the stem and having a concave end provided with an inwardly projecting knife edge flange which engages the edge of the outer face of the jewel and merges into its surface, a hardened steel ball interposed between said jewels.

4. The combination with two relatively rotatable members each of which comprises a jewel having a concave outer face, a setting therefor consisting of a support having a recess in which the jewel is seated, and a cap adjustably secured to the support and having an outer end provided with a concave face and an inwardly projecting flange which engages the edge of the outer face of the jewel and merges into its surface, of a ball interposed between said jewels.

In testimony whereof, I have hereunto subscribed my name this 15th day of February, 1907.

WILLIAM GODBER.

Witnesses:
PAUL E. SCHENNEMAN,
HENRY MILLER.

Copies of this patent may be obtained for five cents each, by addressing the "Commissioner of Patents, Washington, D. C."